(12) United States Patent
Nakamura et al.

(10) Patent No.: US 11,822,476 B2
(45) Date of Patent: Nov. 21, 2023

(54) CACHE USAGE INDEX CALCULATION DEVICE, CACHE USAGE INDEX CALCULATION METHOD, AND CACHE USAGE INDEX CALCULATION PROGRAM

(71) Applicant: Nippon Telegraph and Telephone Corporation, Tokyo (JP)

(72) Inventors: Tetsuro Nakamura, Musashino (JP); Naoki Takada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/626,862

(22) PCT Filed: Jul. 30, 2019

(86) PCT No.: PCT/JP2019/029789
§ 371 (c)(1),
(2) Date: Jan. 13, 2022

(87) PCT Pub. No.: WO2021/019674
PCT Pub. Date: Feb. 4, 2021

(65) Prior Publication Data
US 2022/0261348 A1    Aug. 18, 2022

(51) Int. Cl.
*G06F 12/0842* (2016.01)
*G06F 11/30* (2006.01)

(52) U.S. Cl.
CPC ...... *G06F 12/0842* (2013.01); *G06F 11/3037* (2013.01); *G06F 2212/62* (2013.01)

(58) Field of Classification Search
CPC ............ G06F 12/0842; G06F 2212/62; G06F 11/3037; G06F 11/3409; G06F 12/0811;
(Continued)

(56) References Cited

U.S. PATENT DOCUMENTS

| | | | | |
|---|---|---|---|---|
| 2006/0174045 | A1* | 8/2006 | Maeda | G06F 13/364 710/113 |
| 2007/0150657 | A1* | 6/2007 | Yigzaw | G06F 12/0842 711/E12.039 |

(Continued)

OTHER PUBLICATIONS

Nakamura et al., "Mitigating CPU Cache Contention in Virtual Environments," 2016 IEICE Communication Society Conference, Sep. 20, 2016, 3 pages (with English Translation).
(Continued)

*Primary Examiner* — Hashem Farrokh
(74) *Attorney, Agent, or Firm* — Fish & Richardson P.C.

(57) ABSTRACT

A cache usage indicator calculation apparatus (1) includes: a memory for reading and writing data; a cache that can be accessed more rapidly than the memory; a central processing unit configured to read and write from and to the memory and the cache and execute processing; a usage state measurement unit configured to measure a usage state of the cache used by an application (11a, 11b) executed by the central processing unit; a performance measurement unit configured to measure a cache sensitivity and/or a cache pollutivity relating to an application (11a, 11b); and an indicator calculation unit configured to, based on a performance deterioration of a pre-selected plurality of applications and the usage state of the cache, calculate an indicator for the cache sensitivity and/or an indicator for the cache pollutivity of each application.

13 Claims, 10 Drawing Sheets

(58) Field of Classification Search
CPC ............. G06F 12/084; G06F 2201/885; G06F 2212/1021; G06F 2212/502
USPC .................................................. 711/112, 141
See application file for complete search history.

(56) References Cited

U.S. PATENT DOCUMENTS

| | | | | |
|---|---|---|---|---|
| 2012/0297145 | A1* | 11/2012 | Castillo | ............... G06F 11/3409 |
| | | | | 711/138 |
| 2018/0217937 | A1* | 8/2018 | Koo | ....................... G06F 12/084 |
| 2018/0322024 | A1* | 11/2018 | Nagao | ................... G06F 3/0665 |

OTHER PUBLICATIONS

Nguyen, "Intel's Cache Monitoring Technology: Use Models and Data," Intel Corporation, Mar. 31, 2016, retrieved from URL <https://software.intel.com/en-us/blogs/2014/12/11/intels-cache-monitoring-technology-use-models-and-data>, 14 pages.

Nguyen, "Usage Models for Cache Allocation Technology in the Intel Xeon Processor E5 v4 family," Intel Corporation, Feb. 11, 2016, retrieved from URL <https://software.intel.com/en-us/articles/cache-allocation-technology-usage-models>, 6 pages.

\* cited by examiner

| | perlbench | bzip2 | gcc | mcf | gobmk | hmmer | sjeng | libquantum | h264ref | omnetpp | astar | xalancbmk | Sensitivity |
|---|---|---|---|---|---|---|---|---|---|---|---|---|---|
| perlbench | 3% | 1% | 2% | 1% | 2% | 1% | 2% | 4% | 2% | 21% | 3% | 7% | 4% |
| bzip2 | 3% | 2% | 2% | 1% | 3% | 1% | 1% | 7% | 2% | 18% | 4% | 5% | 4% |
| gcc | 3% | 2% | 5% | 0% | 3% | 1% | 2% | 11% | 1% | 25% | 2% | 6% | 5% |
| mcf | 6% | 3% | 8% | 2% | 5% | 1% | 2% | 18% | 2% | 64% | 7% | 18% | 11% |
| gobmk | 3% | 1% | 1% | 0% | 2% | 2% | 2% | 4% | 2% | 10% | 3% | 3% | 3% |
| hmmer | 2% | 1% | 2% | -2% | 2% | 1% | 2% | 5% | 2% | 9% | 2% | 3% | 2% |
| sjeng | 3% | 2% | 2% | -2% | 3% | 3% | 2% | 2% | 1% | 16% | 4% | 6% | 3% |
| libquantum | 14% | 11% | 19% | 45% | 6% | 1% | 4% | 43% | 2% | 88% | 16% | 49% | 23% |
| h264ref | 1% | 1% | 2% | -2% | 2% | 2% | 1% | 7% | 2% | 10% | 4% | 3% | 3% |
| omnetpp | 7% | 3% | 6% | 0% | 4% | 1% | 2% | 15% | 2% | 51% | 6% | 15% | 9% |
| astar | 3% | 1% | 3% | -1% | 3% | 2% | 1% | 8% | 2% | 18% | 7% | 6% | 4% |
| xalancbmk | 4% | 2% | 4% | 2% | 4% | 1% | 2% | 14% | 2% | 39% | 6% | 13% | 7% |
| Pollutivity | 4% | 2% | 5% | 4% | 3% | 1% | 2% | 12% | 2% | 31% | 5% | 11% | |

|  | 15 ← Capacity Mask → 0 |
|---|---|
| CLOS[0]:Mask | 1 1 1 1 0 0 0 0 0 0 0 0 0 0 0 0 |
| CLOS[1]:Mask | 0 0 0 0 1 1 1 1 0 0 0 0 0 0 0 0 |
| CLOS[2]:Mask | 0 0 0 0 0 0 0 0 1 1 1 1 1 1 0 0 |
| CLOS[3]:Mask | 0 0 0 0 0 0 0 0 1 1 1 1 1 1 1 1 |

CACHE USAGE INDEX CALCULATION DEVICE, CACHE USAGE INDEX CALCULATION METHOD, AND CACHE USAGE INDEX CALCULATION PROGRAM

CROSS-REFERENCE TO RELATED APPLICATIONS

This application is a National Stage application under 35 U.S.C. § 371 of International Application No. PCT/JP2019/029789, having an International Filing Date of Jul. 30, 2019. The disclosure of the prior application is considered part of the disclosure of this application, and is incorporated in its entirety into this application.

TECHNICAL FIELD

The present invention relates to a cache usage indicator calculation apparatus, a cache usage indicator calculation method, and a cache usage indicator calculation program.

BACKGROUND ART

A cache memory is a high-speed small-capacity memory that is used to conceal delay in a main memory when a central processing unit (CPU) accesses data, a command, or the like. A cache memory is important when a computer increases the speed of processing of an application.

FIG. 9 is a graph showing a relationship between cache occupancy amounts of applications and performance. Note that FIG. 9 is a citation of a graph published in NPL 1.

The horizontal axis of the graph indicates the cache occupancy amount, and the vertical axis of the graph indicates the normalized performance. The diamond-shaped plots are plots relating to Povray. The square plots are plots relating to Bzip2. The triangular plots are plots relating to MCF. The X-shaped plots are plots relating to Bwaves.

As indicated by this graph, when the occupancy amount of the cache decreases, the cache miss count increases. With Bwaves, the performance decreases by about 60% when the cache occupancy amount is 0 MB compared to when the cache occupancy amount is 15 MB.

Cache Allocation Technology refers to a function by which a CPU can restrict and control use of a final-level cache for each application.

FIG. 10 is a diagram showing an example of 16-bit Cache Allocation Technology.

As described in NPL 2, Cache Allocation Technology is installed, which is a function by which use of a final-level cache can be restricted and controlled for each application, from the Intel Xeon (registered trademark) processor E5 2600 v3 product family released in September 2014.

With these processors, it is possible to determine the level of Class of Service (CLOS) for each application process, and the range up to which the final-level cache is to be used for each CLOS is controlled with a capacity mask.

In the example shown in FIG. 10, for CLOS[0], four is are set from the 15th bit to the 12th bit, which indicates that ¼ of the final-level cache is used. Note that 1s are set from the 15th bit to the 12th bit only for CLOS[0], which indicates that an application of CLOS[0] occupies the regions corresponding to these bits. Note that each bit of CLOS[n] corresponds to a region of the final-level cache.

For CLOS[1], four is are set from the 11th bit to the 8th bit, which indicates that ¼ of the final-level cache is used. Note that 1s are set from the 11th bit to the 8th bit only for CLOS[1], which indicates that an application of CLOS[1] occupies the regions corresponding to these bits.

For CLOS[2], six is are set from the 7th bit to the 2nd bit, which indicates that ⅜ of the final-level cache is used. Note that is are similarly set from the 7th bit to the 2nd bit for CLOS[3] as well, which indicates that applications of CLOS[2] and CLOS[3] share the regions corresponding to these bits.

For CLOS[3], eight is are set from the 7th bit to the 0th bit, which indicates that ½ of the final-level cache is used. Note that is are similarly set from the 7th bit to the 2nd bit for CLOS[3] as well, which indicates that an application of CLOS[2] and an application of CLOS[3] share the regions corresponding to these bits. This indicates that is are set from the 1st bit to the 0th bit only for CLOS[3], and an application of CLOS[3] occupies the regions corresponding to these bits.

CITATION LIST

Non-Patent Literature

[NPL 1] Nguyen, Khang T, "Intel's Cache Monitoring Technology: Use Models and Data", [online], published on Dec. 11, 2014, updated Mar. 31, 2016, [searched for on Jul. 25, 2019], Internet <URL: https://software.intel.com/en-us/blogs/2014/12/11/intels-cache-monitoring-technology-use-models-and-data>

[NPL 2] "Usage Models for Cache Allocation Technology in the Intel Xeon Processor E5 v4 family", [online], [searched for on Jul. 25, 2019], Internet <URL: https://software.intel.com/en-us/articles/cache-allocation-technology-usage-models>

SUMMARY OF THE INVENTION

Technical Problem

The degree to which the performance obtained when multiple applications operate deteriorates relative to the performance obtained when a single application operates is called the cache sensitivity of the application. When performing tuning using Cache Allocation Technology, the inventors thought of a policy of allocating many cache memories to an application with a high cache sensitivity. This makes it possible to improve the performance of the application.

The degree to which the performance of another application 11 deteriorates when multiple applications operate is called the cache pollutivity of that application. The inventors thought of a policy of allocating a small amount of cache memory to an application with a high cache pollutivity. This makes it possible to suppress the influence on another application when the application operates.

In view of this, the present invention aims to calculate the cache sensitivity and the cache pollutivity based on the cache usage state of each application.

Means for Solving the Problem

In order to solve the above-described problem, a cache usage indicator calculation apparatus of the present invention includes:

a memory for reading and writing data;

a cache that can be accessed more rapidly than the memory;

a central processing unit configured to read and write from and to the memory and the cache and execute processing;

a usage state measurement unit configured to measure a usage state of the cache used by an application executed by the central processing unit;

a performance measurement unit configured to measure a cache sensitivity and a cache pollutivity relating to an application; and an indicator calculation unit configured to, based on performance deterioration of a pre-selected plurality of applications and the usage state of the cache, calculate an indicator for the cache sensitivity and/or an indicator for the cache pollutivity of each application.

Other means will be described in the mode for carrying out the invention.

Effects of the Invention

According to the present invention, it is possible to calculate the cache sensitivity and the cache pollutivity based on the cache usage state of each application.

BRIEF DESCRIPTION OF DRAWINGS

FIG. 5 is a diagram illustrating an operation for calculating the cache sensitivity and the cache pollutivity of each application.

FIG. 10 is a diagram showing an example of 16-bit Cache Allocation Technology.

DESCRIPTION OF EMBODIMENTS

Hereinafter, an embodiment of the present invention will be described in detail with reference to the drawings.

BACKGROUND DESCRIPTION OF THE INVENTION

If multiple virtual machines operate at the same time on a physical host, there is a risk that a cache conflict will occur and the performance will decrease.

Figure 7:
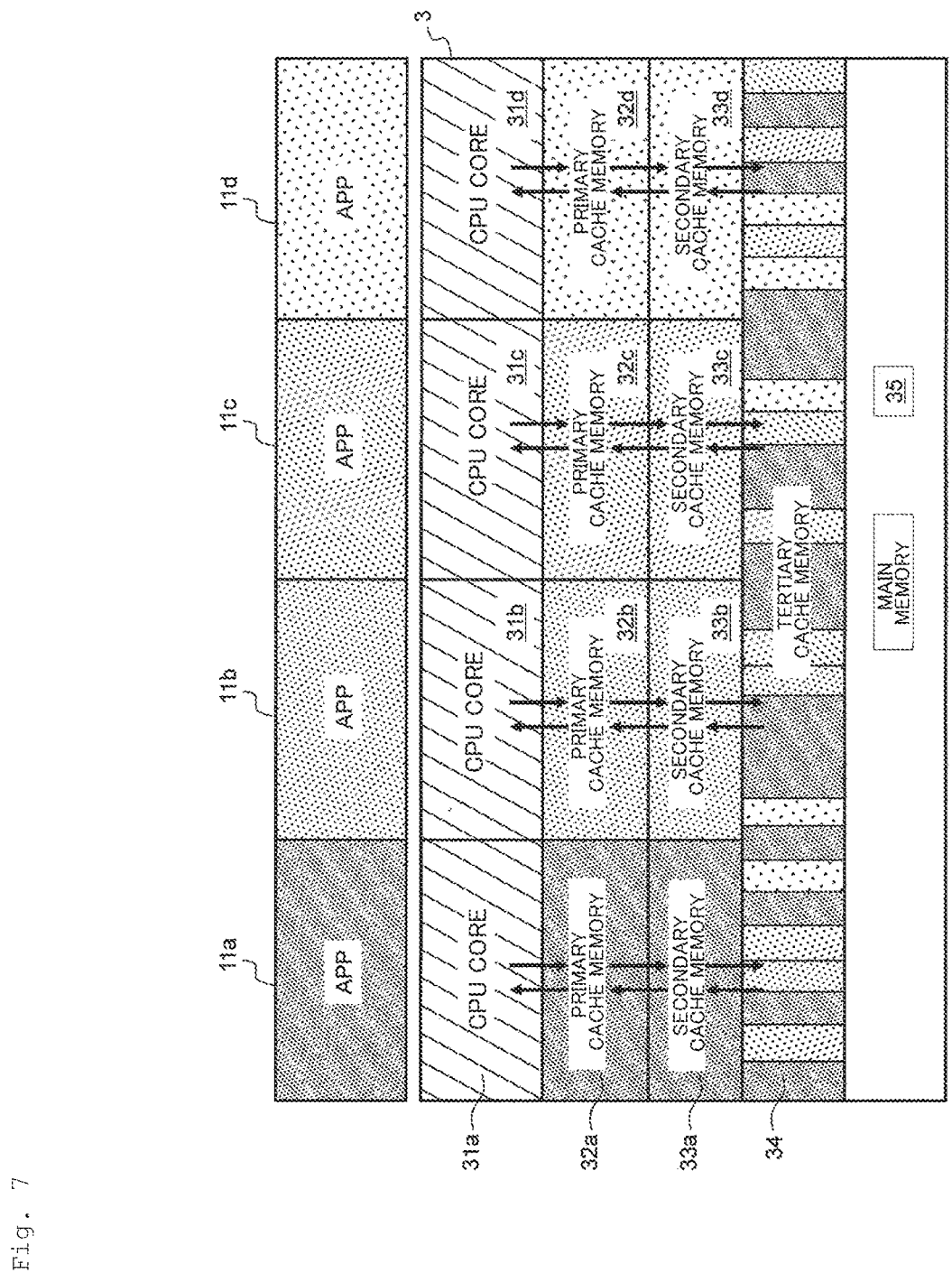
FIG. 7 is a diagram showing the state of caches when multiple applications operate at the same time on a physical host.

FIG. 7 is a diagram showing the state of each cache when multiple applications run at the same time on a physical host.

Figure 8:
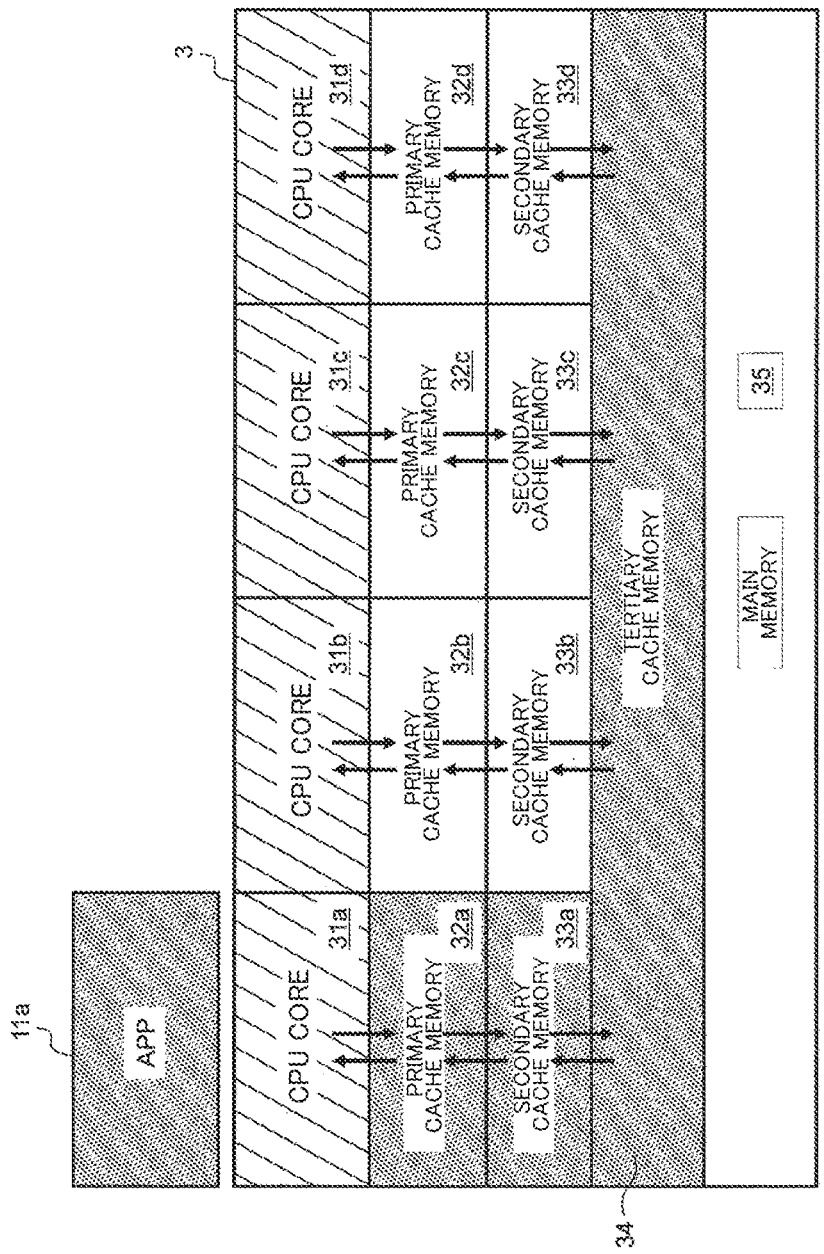
FIG. 8 is a diagram showing the state of caches when a single application operates on a physical host.
Figure 9:
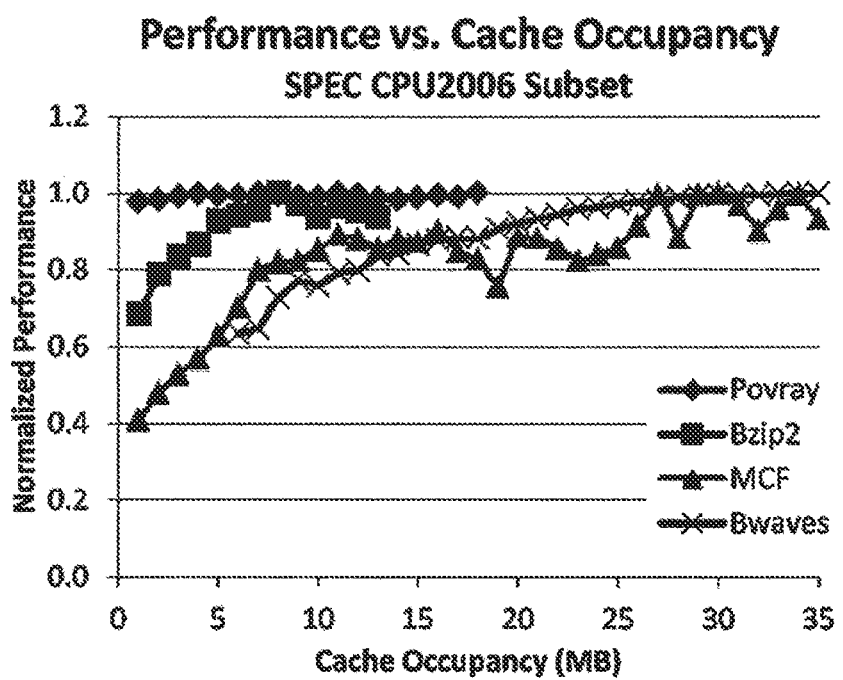
FIG. 9 is a graph showing a relationship between cache occupancy amounts and performances of applications.

FIG. 8 is a diagram showing the state of each cache when a single application runs on a physical host.

A physical host 3 is constituted by including CPU (Central Processing Unit) cores 31$a$ to 31$d$, primary cache memories 32$a$ to 32$d$, secondary cache memories 33$a$ to 33$d$, a tertiary cache memory 34, and a main memory 35. The main memory 35 is a RAM (Random Access Memory) for reading and writing data. The primary cache memories 32$a$ to 32$d$, the secondary cache memories 33$a$ to 33$d$, and the tertiary cache memory 34 are storage regions that can be accessed more rapidly than the main memory 35. The CPU cores 31$a$ to 31$d$ are central processing units that execute processing by reading and writing from and to the primary cache memories 32$a$ to 32$d$, the secondary cache memories 33$a$ to 33$d$, the tertiary cache memory 34, and the main memory 35.

In a multi-core configuration, which is mainstream for current CPUs, multiple CPU cores 31$a$ to 31$d$ commonly share a lower-order cache such as the tertiary cache memory 34. Hereinafter, when no particular distinction is made between the CPU cores 31$a$ to 31$d$, they will simply be described as "CPU cores 31".

Multiple applications 11$a$ to 11$d$ operate on the physical host 3 shown in FIG. 7. Hereinafter, when no particular distinction is made between the applications 11$a$ to 11$d$, they will simply be described as "applications 11".

The application 11$a$ occupies the CPU core 31$a$, the primary cache memory 32$a$, and the secondary cache memory 33$a$, and further shares part of the tertiary cache memory 34.

The application 11$b$ occupies the CPU core 31$b$, the primary cache memory 32$b$, and the secondary cache memory 33$b$, and further shares part of the tertiary cache memory 34.

The application 11$c$ occupies the CPU core 31$c$, the primary cache memory 32$c$, and the secondary cache memory 33$c$, and further shares part of the tertiary cache memory 34.

The application 11$d$ occupies the CPU core 31$d$, the primary cache memory 32$d$, and the secondary cache memory 33$d$, and further shares part of the tertiary cache memory 34.

When multiple applications 11$a$ to 11$d$ run on the same node, the tertiary cache memory 34 is polluted by the applications 11$a$ to 11$d$ and the number of cache misses relatively increases. The CPU core 31 in which the cache miss has occurred needs to go reference the main memory 35, which takes more than double the time to access compared to the tertiary cache memory 34. The applications 11 cause a decrease in performance resulting from penalties for such a cache miss. This is called a cache conflict caused by multiple applications 11.

In contrast to this, a single application 11$a$ operates on the physical host 3 shown in FIG. 8. When the single application 11$a$ runs, a state is entered in which the tertiary cache memory 34, which is a shared cache memory, is occupied. At this time, no other applications 11 are operating, and therefore cache pollution does not occur.

Embodiments of the Present Invention

Figure 1:
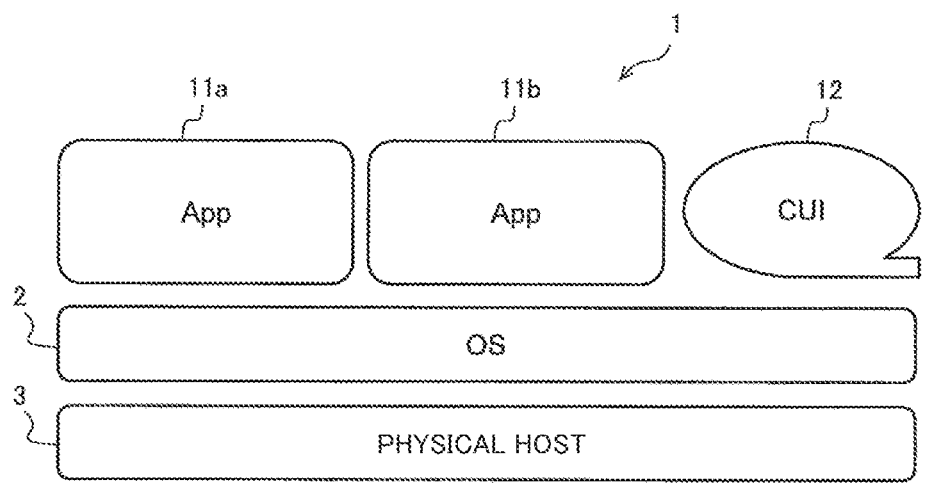
FIG. 1 is a diagram showing a configuration of a cache evaluation indicator acquisition system of the present embodiment.

FIG. 1 is a diagram showing a configuration of a cache evaluation indicator acquisition system 1 of the present embodiment.

The cache evaluation indicator acquisition system 1 is constituted by including an OS (Operating System) 2 that operates on the physical host 3, multiple applications 11$a$ and 11b that operate on the OS 2, and a cache usage indicator calculation unit 12. Note that in FIG. 1, the cache usage indicator calculation unit 12 is written as "CUI" (Cache Usage Indicator calculation).

The physical host 3 is a combination of a central processing unit, caches, and memories for causing the OS 2, the applications 11a and 11b, and the cache usage indicator calculation unit 12 to operate, and for example, is configured similarly to the physical host 3 shown in FIGS. 7 and 8.

The OS 2 is basic software for controlling execution of a program that operates on the physical host 3, and performs job management, input/output control, data management, and processing relating thereto.

The applications 11a and 11b are programs that operate in the environments of the physical host 3 and the OS 2 respectively. The applications 11a and 11b may also be virtual machines or containers.

A desired amount of cache memory can be allocated to the applications 11a and 11b by setting up a capacity mask of the CLOS corresponding to the applications 11a and 11b. Hereinafter, when no particular distinction is made between the applications 11a and 11b, they are simply written as "applications 11".

The cache usage indicator calculation unit 12 is a portion that tunes the cache allocation amounts of the applications 11 that operate on the physical host 3. The function of the cache usage indicator calculation unit 12 is realized by a processor (not shown) of the physical host 3 executing a program for cache tuning.

Figure 2:
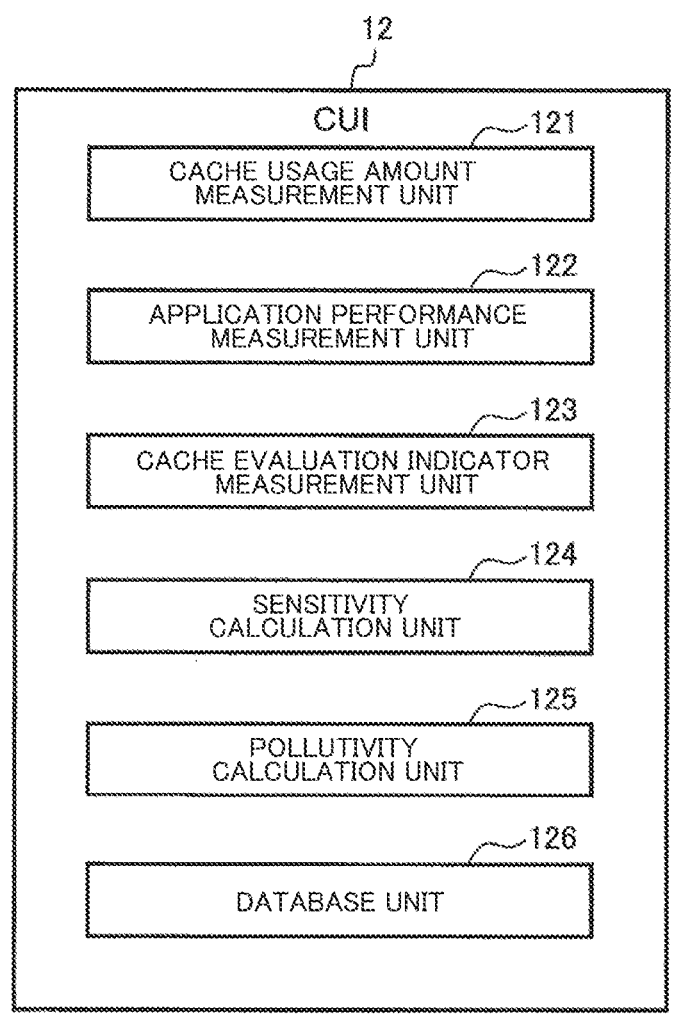
FIG. 2 is a block diagram showing a cache usage indicator calculation unit.

FIG. 2 is a block diagram showing the cache usage indicator calculation unit 12.

The cache usage indicator calculation unit 12 is constituted by including a cache usage amount measurement unit 121, an application performance measurement unit 122, a cache evaluation indicator calculation unit 123, a sensitivity calculation unit 124, a pollutivity calculation unit 125, and a database unit 126.

The cache usage amount measurement unit 121 acquires values relating to the cache and cache usage parameters regarding how the cache is being used by the applications 11. That is, the cache usage amount measurement unit 121 functions as a usage state measurement unit for measuring the usage state of the tertiary cache memory 34 by the applications 11 executed by the CPU cores 31. These applications 11 include virtual machines, containers, and the like.

The values relating to the cache and the cache usage parameters are, for example, a cache prefetch count, a cache reference count, a cache hit count, a cache miss count, a cache miss rate, a dTLB load count, a dTLB miss count, and a dTLB miss rate. The values relating to the cache and the cache usage parameters of the measured applications 11 are stored in the database unit 126.

The application performance measurement unit 122 measures the performance of each application 11. The application performance measurement unit 122 measures the performance in which case where each application 11 operates alone, and measures the performance in the case where two applications 11 operate in combination with each other. The measured performance of each application 11 is stored in the database unit 126. Accordingly, the application performance measurement unit 122 calculates the performance deterioration that occurs when multiple applications 11 operate compared to the performance obtained when each application 11 operates alone. That is, the application performance measurement unit 122 functions as a performance measurement unit that measures the cache sensitivities and the cache pollutivities relating to the applications 11.

The cache evaluation indicator calculation unit 123 calculates indicators for the cache sensitivities and indicators for the cache pollutivities based on the performance deterioration obtained by the application performance measurement unit 122 and the measurement amount obtained by the cache usage amount measurement unit 121.

The sensitivity calculation unit 124 calculates the sensitivities of these applications 11 by statistically processing the performances obtained when the applications 11 operate alone and the performances obtained when multiple applications 11 operate, the applications 11 having been extracted as representative applications. Furthermore, the sensitivity calculation unit 124 calculates the cache sensitivity of a new application 11 based on how the application 11 is using the cache and the cache sensitivity of the application 11.

The pollutivity calculation unit 125 calculates the pollutivities of these applications 11 by statistically processing the performances obtained when the applications 11 operate alone and the performances obtained when multiple applications 11 operate, the applications 11 having been extracted as representative applications. Furthermore, the pollutivity calculation unit 125 calculates the cache pollutivity of a new application 11 based on how the application 11 is using the cache, and the indicator for the cache pollutivity of the application 11.

The sensitivity calculation unit 124 and the pollutivity calculation unit 125 function as calculation units that calculate the cache sensitivities and/or the cache pollutivities of the applications based on the partial regression coefficients and the cache usage state.

Figure 3:
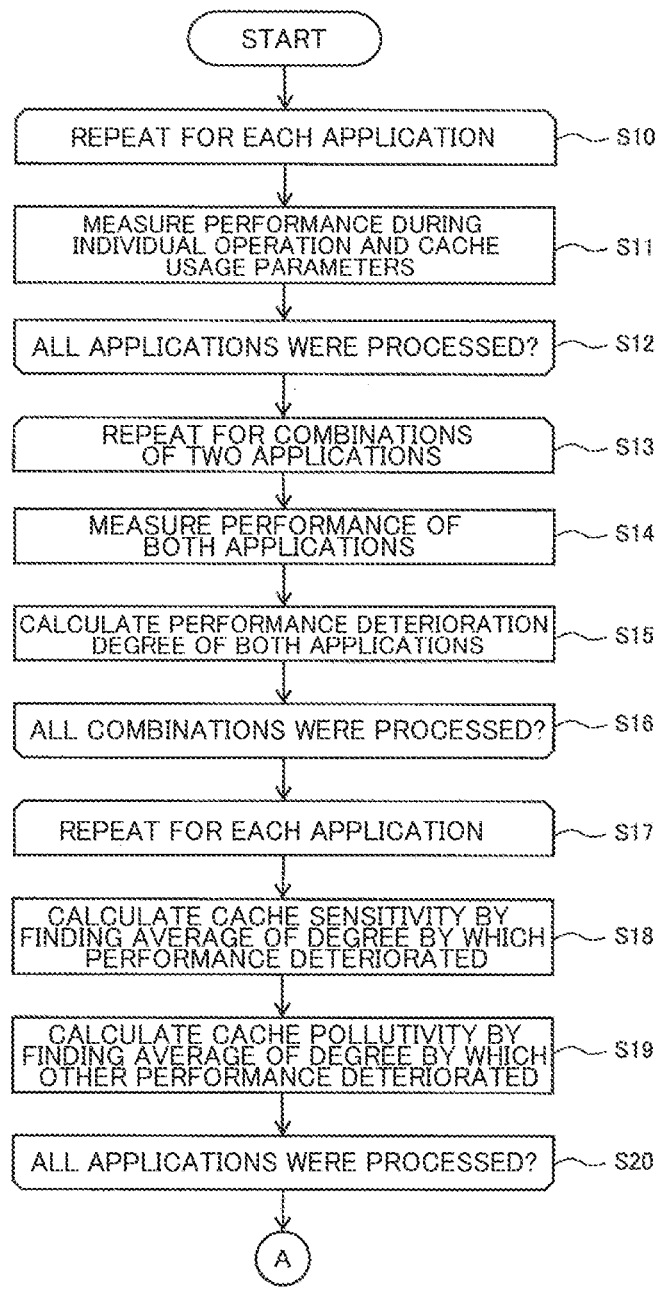
FIG. 3 is a (first) flowchart showing processing for calculating a partial regression coefficient for the cache sensitivity and a partial regression coefficient for the cache pollutivity of a representative application.
Figure 4:
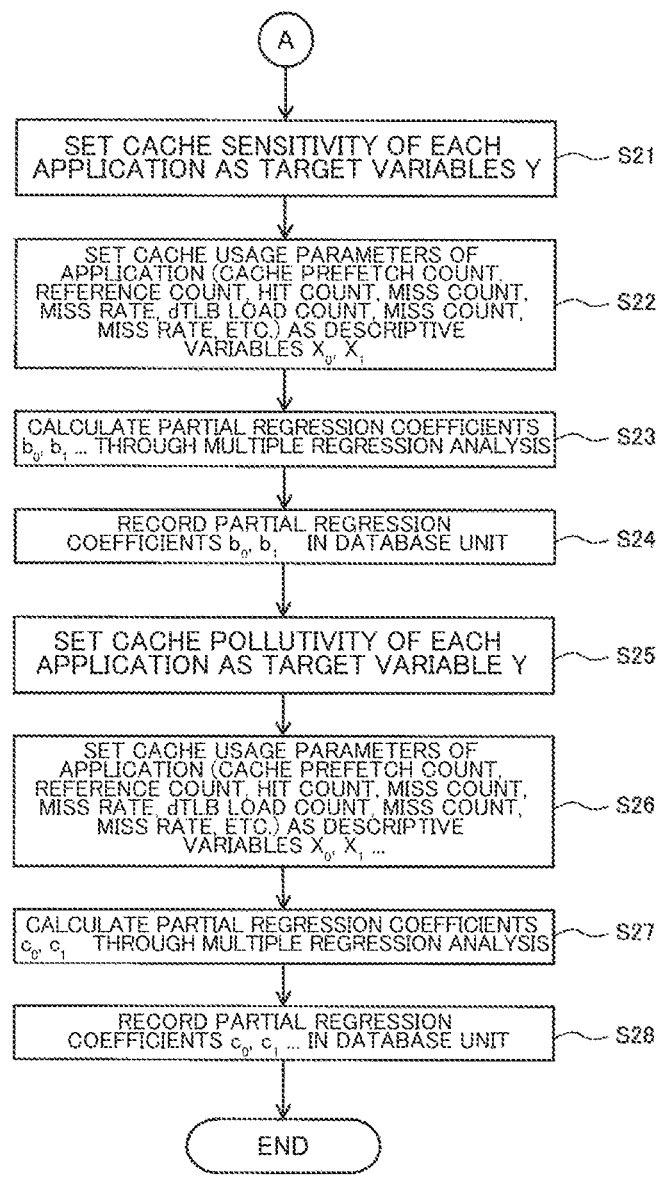
FIG. 4 is a (second) flowchart showing processing for calculating a partial regression coefficient for the cache sensitivity and a partial regression coefficient for the cache pollutivity of a representative application.

FIGS. 3 and 4 are flowcharts showing processing for calculating a partial regression coefficient for a cache sensitivity and a partial regression coefficient for a cache pollutivity of a representative application 11.

In steps S10 to S12, the cache usage indicator calculation unit 12 repeatedly performs processing regarding each application 11 extracted as being representative. Here, it is desirable that as many applications as possible that are to be used as the CPU benchmark are extracted and processed by the cache usage indicator calculation unit 12.

In step S11, the application performance measurement unit 122 measures the performances obtained when the applications operate alone, and the cache usage amount measurement unit 121 measures the cache usage parameters.

In step S12, the cache usage indicator calculation unit 12 determines whether or not all of the applications 11 have been processed. If there is an unprocessed application 11, the cache usage indicator calculation unit 12 returns to step S10 and repeatedly performs processing. If all of the applications 11 have been processed, the cache usage indicator calculation unit 12 advances to step S13.

In steps S13 to S16, the cache usage indicator calculation unit 12 repeatedly performs processing on combinations of two applications whose performances obtained during individual operation were measured.

The application performance measurement unit 122 measures the performance by causing both combined applications 11 to operate (S14), and stores the measured performance data in the database unit 126.

Furthermore, the application performance measurement unit 122 calculates the deterioration degree of the performances of both applications 11 (S15) and stores the calculated performance deterioration degree in the database unit 126.

In step S16, the cache usage indicator calculation unit 12 determines whether or not all combinations of the applications 11 have been processed. If there is an unprocessed combination of applications 11, the cache usage indicator calculation unit 12 returns to step S13 and repeatedly performs processing. If all combinations of the applications 11 have been processed, the cache usage indicator calculation unit 12 advances to step S17.

In steps S17 to S20, the cache usage indicator calculation unit 12 repeatedly performs processing for each application 11 extracted as being representative.

The sensitivity calculation unit 124 calculates the cache sensitivity by finding the average of the degree by which the performance obtained when multiple applications 11 operate deteriorates relative to the performance obtained when an application 11 operates alone (S18).

The pollutivity calculation unit 125 calculates the cache pollutivity by finding the average of the degrees to which the performances of the other applications 11 deteriorate when multiple applications 11 operate (S19).

In step S20, the cache usage indicator calculation unit 12 determines whether or not all of the applications 11 have been processed. If there is an unprocessed application 11, the cache usage indicator calculation unit 12 returns to step S17 and repeatedly performs processing. If all of the applications 11 have been processed, the cache usage indicator calculation unit 12 advances to step S21.

The description will continue with reference to FIG. 4. Steps S21 to S24 are processing for calculating an indicator for the cache sensitivity, and steps S25 to S28 are processing for calculating an indicator for the cache pollutivity.

The cache evaluation indicator calculation unit 123 sets the cache sensitivity of each application 11 as a target variable Y (S21).

The cache evaluation indicator calculation unit 123 sets the cache usage parameters of each application as descriptive variables $X_0, X_1, \ldots$ (S22). Here, the cache prefetch count, the cache reference count, the cache hit count, the cache miss count, the cache miss rate, the dTLB load count, the dTLB miss count, the dTLB miss rate, and the like are allocated to each descriptive variable $X_0, X_1, \ldots$. Note that the target variable Y and the descriptive variables $X_0, X_1, \ldots$ satisfy the following Formula (1).

[Math. 1]

$$Y = b_0 X_0 + b_1 X_1 + b_2 X_2 + b_3 X_3 + \quad (1)$$

Here, the partial regression coefficients $b_0, b_1, \ldots$ are indicators for the cache sensitivity.

The cache evaluation indicator calculation unit 123 calculates the partial regression coefficients $b_0, b_1, \ldots$ based on the target variable Y and the descriptive variables $X_0, X_1, \ldots$ (S23), and records the calculated partial regression coefficients $b_0, b_1, \ldots$ in the database unit 126 (S24).

The cache evaluation indicator calculation unit 123 sets the cache pollutivity of each application 11 as the target variable Y (S25) and sets the cache usage parameters of each application 11 as the descriptive variables $X_0, X_1, \ldots$ (S26). Note that the target variable Y and the descriptive variables $X_0, X_1, \ldots$ satisfy the following Formula (2).

[Math. 2]

$$Y = c_0 X_0 + c_1 X_1 + c_2 X_2 + c_3 X_3 + \quad (2)$$

Here, the partial regression coefficients $c_0, c_1, \ldots$ are indicators for the cache sensitivity.

The cache evaluation indicator calculation unit 123 calculates the partial regression coefficients $c_0, c_1, \ldots$ based on the target variable Y and the descriptive variables $X_0, X_1, \ldots$ (S27). That is, the cache usage parameter that relates to the cache pollutivity of the application 11 is found, and weighting is performed. The cache evaluation indicator calculation unit 123 records the calculated partial regression coefficients $c_0, c_1, \ldots$ in the database unit 126 (S28), and the processing of FIG. 4 ends.

With this processing, the partial regression coefficients $b_0, b_1, \ldots$ are calculated as indicators of the cache sensitivity, and the partial regression coefficients $c_0, c_1, \ldots$ are calculated as indicators of the cache pollutivity. The cache sensitivity and the cache pollutivity corresponding to the target variable Y can be calculated through measurement of these partial regression coefficients and the cache usage parameters corresponding to the descriptive coefficients $X_0, X_1, \ldots$ for an unknown application 11.

FIG. 5 is a diagram illustrating measurement data for calculating the cache sensitivity and the cache pollutivity of each application.

The second to thirteenth rows indicate the applications for which the degree of performance deterioration was measured. The second to thirteenth columns indicate other applications that were operated in combination with the applications indicated in the rows.

The fourteenth row indicates the average values of the values from the second row to the thirteenth row of each column. These are the measurement values of the cache pollutivity for the applications indicated in the first row of the columns.

The fourteenth column indicates the average value of the values from the second column to the thirteenth column of each row. This is the result of measuring the cache sensitivity for the application indicated in the first column of that row.

Figure 6:
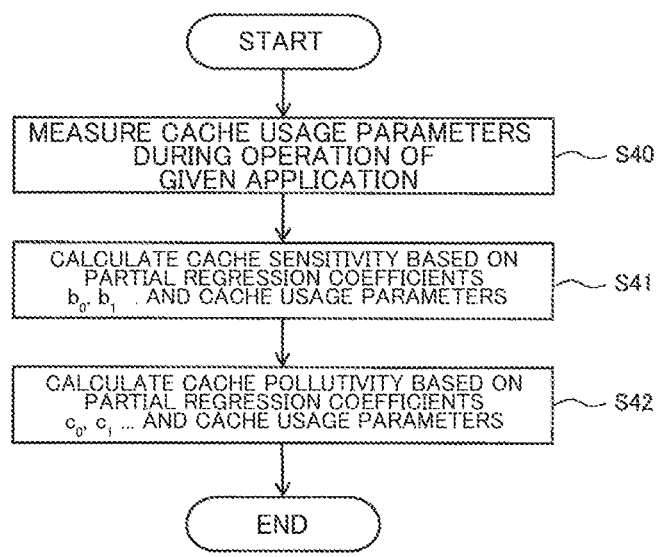
FIG. 6 is a flowchart showing processing for calculating the cache sensitivity and the cache pollutivity of a given application.

FIG. 6 is a flowchart showing processing for calculating the cache sensitivity and the cache pollutivity of a given application.

First, the cache usage amount measurement unit 121 measures the cache usage parameter obtained when a given application 11 is operated (S40).

The sensitivity calculation unit 124 calculates the cache sensitivity of the application 11 based on the partial regression coefficients $b_0, b_1, \ldots$ that were calculated in advance and the cache usage parameters of the application 11.

The sensitivity calculation unit 124 calculates the cache pollutivity of the application 11 based on the partial regression coefficients $c_0, c_1, \ldots$ that were calculated in advance and the cache usage parameters of the application 11 (S42), and ends the processing of FIG. 6.

Effects of the Present Embodiment

The cache sensitivity and cache pollutivity of a given application can be measured easily. This makes it possible to provide indicators for tuning of a cache memory to a user.

Configuration of Above-Described Embodiment and Operations and Effects Thereof (1) The cache usage indicator calculation apparatus is characterized by including:

a memory for reading and writing data;

a cache that can be accessed more rapidly than the memory;

a central processing unit configured to read and write from and to the memory and the cache and execute processing;

a usage state measurement unit configured to measure a usage state of the cache used by an application executed by the central processing unit;

a performance measurement unit configured to measure a cache sensitivity and a cache pollutivity relating to an application; and an indicator calculation unit configured to, based on performance deterioration of a pre-selected plurality of applications and the usage state of the cache, calculate an indicator for the cache sensitivity and/or an indicator for the cache pollutivity of each application.

This makes it possible to calculate the cache sensitivity and cache pollutivity based on the cache usage state of each application.

(2) The performance measurement unit of the cache usage indicator calculation apparatus according to (1) is characterized in that the performance measurement unit uses an average of degrees of performance deterioration of a first application among a pre-selected plurality of applications obtained when the first application is operated in combination with a second application among the plurality of applications, with respect to a performance obtained when the first application is operated alone, as the cache sensitivity of the first application.

This makes it possible to measure the cache sensitivity of the application.

(3) The performance measurement unit of the cache usage indicator calculation apparatus according to (1) is characterized in that the performance measurement unit uses an average of degrees of performance deterioration of a first application among a pre-selected plurality of applications obtained when the first application is operated in combination with a second application among the plurality of applications, with respect to a performance obtained when the first application is operated alone, as the cache pollutivity of the second application.

This makes it possible to measure the cache pollutivity of the application.

(4) The indicator calculation unit of the cache usage indicator calculation apparatus according to any one of (1) to (3) is characterized in that the indicator calculation unit performs multiple regression analysis using the performance deterioration of each application as a target variable and the usage state of the cache as a descriptive variable, and calculates a partial regression coefficient.

This makes it possible to specify the usage state of the cache that contributes to the cache sensitivity and/or the cache pollutivity of the application.

(5) The cache usage indicator calculation apparatus according to (4) is characterized by further including a calculation unit configured to calculate the cache sensitivity and/or the cache pollutivity of an application based on the partial regression coefficient and the usage state of the cache.

This makes it possible to calculate the cache sensitivity and/or the cache pollutivity by measuring the cache usage state of a given application.

(6) A cache usage indicator calculation method is characterized in that a computer including a memory for reading and writing data, a cache that can be accessed more rapidly than the memory, and a central processing unit configured to read and write from and to the memory and the cache and execute processing, executes:

a step of measuring a usage state of the cache used by an application executed by the central processing unit;

a step of measuring a cache sensitivity and/or a cache pollutivity relating to a pre-selected plurality of applications; and a step of calculating, based on the performance deterioration of each application and the usage state of the cache, an indicator for the cache sensitivity and/or an indicator for the cache pollutivity of each application.

This makes it possible to calculate the cache sensitivity and cache pollutivity based on the cache usage state of each application.

(7) The cache usage indicator calculation method according to (6) is characterized by further executing a step of calculating the cache sensitivity and/or the cache pollutivity of an application based on the indicator and the usage state of the cache.

This makes it possible to calculate the cache sensitivity and/or the cache pollutivity by measuring the cache usage state of a given application.

(8) A cache usage indicator calculation program is for causing a computer including a memory for reading and writing data, a cache that can be accessed more rapidly than the memory, and a central processing unit configured to read and write from and to the memory and the cache and execute processing, to execute:

a procedure of measuring a usage state of the cache used by an application executed by the central processing unit;

a procedure of measuring a cache sensitivity and/or a cache pollutivity relating to a pre-selected plurality of applications; and a procedure of calculating, based on the performance deterioration of each application and the usage state of the cache, an indicator for the cache sensitivity and/or an indicator for the cache pollutivity of each application.

This makes it possible to calculate the cache sensitivity and cache pollutivity based on the cache usage state of each application.

VARIATIONS

The present invention is not limited to the above-described embodiment, can be modified without departing from the gist of the present invention, and for example, variations such as the following (a) to (c) are possible.

(a) The applications shown in FIG. 5 are exemplary, and there is no limitation to these applications.

(b) A virtual machine or a container may also be included in the application being measured.

(c) Either one of the cache sensitivity and the cache pollutivity may be calculated.

REFERENCE SIGNS LIST

1 Cache evaluation indicator acquisition system
11, 11a to 11d Application
12 Cache usage indicator calculation unit
121 Cache usage amount measurement unit (usage state measurement unit)
122 Application performance measurement unit (performance measurement unit)
123 Cache evaluation indicator calculation unit (indicator calculation unit)
124 Sensitivity calculation unit (calculation unit)
125 Pollutivity calculation unit (calculation unit)
126 Database unit
2 OS
3 Physical host
31, 31a to 31d CPU core (central processing unit)
32a to 32d Primary cache memory
33a to 33d Secondary cache memory
34 Tertiary cache memory (cache)
35 Main memory (memory)

The invention claimed is:

1. A cache usage indicator calculation apparatus comprising:
a memory for reading and writing data;
a cache configured to be accessed more rapidly than the memory;
a central processing unit configured to read and write from and to the memory and the cache and execute processing;
a usage state measurement unit, including one or more processors, configured to measure a usage state of the cache used by an application executed by the central processing unit;
a performance measurement unit, including one or more processors, configured to measure a cache sensitivity and a cache pollutivity relating to an application; and
an indicator calculation unit, including one or more processors, configured to, based on performance deterioration of a pre-selected plurality of applications and the usage state of the cache, calculate an indicator for the cache sensitivity and/or an indicator for the cache pollutivity of each application, wherein the indicator calculation unit is configured to perform multiple regression analysis using the performance deterioration of each application as a target variable and the usage state of the cache as a descriptive variable, and calculate a partial regression coefficient.

2. The cache usage indicator calculation apparatus according to claim 1, wherein the performance measurement unit is configured to use an average of degrees of performance deterioration of a first application among a pre-selected plurality of applications obtained when the first application is operated in combination with a second application among the plurality of applications, with respect to a performance obtained when the first application is operated alone, as the cache sensitivity of the first application.

3. The cache usage indicator calculation apparatus according to claim 1, wherein the performance measurement unit is configured to use an average of degrees of performance deterioration of a first application among a pre-selected plurality of applications obtained when the first application is operated in combination with a second application among the plurality of applications, with respect to a performance obtained when the first application is operated alone, as the cache pollutivity of the second application.

4. The cache usage indicator calculation apparatus according to claim 1, further comprising a calculation unit, including one or more processors, configured to calculate one or more of the cache sensitivity or the cache pollutivity of an application based on the partial regression coefficient and the usage state of the cache.

5. A cache usage indicator calculation method, executed by a computer including
a memory for reading and writing data,
a cache that can be accessed more rapidly than the memory, and
a central processing unit configured to read and write from and to the memory and the cache and execute processing,
the method comprising:
a step of measuring a usage state of the cache used by an application executed by the central processing unit;
a step of measuring one or more of a cache sensitivity or a cache pollutivity relating to a pre-selected plurality of applications; and
a step of calculating, based on the performance deterioration of each application and the usage state of the cache, an indicator for one or more of the cache sensitivity or an indicator for the cache pollutivity of each application, wherein the step of calculating comprises: performing multiple regression analysis using the performance deterioration of each application as a target variable and the usage state of the cache as a descriptive variable, and calculating a partial regression coefficient.

6. The cache usage indicator calculation method according to claim 5, further comprising a step of calculating one or more of the cache sensitivity or the cache pollutivity of an application based on the indicator and the usage state of the cache.

7. The cache usage indicator calculation method according to claim 5, further comprising: using an average of degrees of performance deterioration of a first application among a pre-selected plurality of applications obtained when the first application is operated in combination with a second application among the plurality of applications, with respect to a performance obtained when the first application is operated alone, as the cache sensitivity of the first application.

8. The cache usage indicator calculation method according to claim 5, further comprising: using an average of degrees of performance deterioration of a first application among a pre-selected plurality of applications obtained when the first application is operated in combination with a second application among the plurality of applications, with respect to a performance obtained when the first application is operated alone, as the cache pollutivity of the second application.

9. The cache usage indicator calculation method according to claim 5, further comprising: calculating the cache sensitivity and/or the cache pollutivity of an application based on the partial regression coefficient and the usage state of the cache.

10. A non-transitory computer readable medium storing a cache usage indicator calculation program for causing
a computer including
a memory for reading and writing data,
a cache that can be accessed more rapidly than the memory, and
a central processing unit configured to read and write from and to the memory and the cache and execute processing,
to execute:
a step of measuring a usage state of the cache used by an application executed by the central processing unit;
a step of measuring a cache sensitivity and/or a cache pollutivity relating to a pre-selected plurality of applications; and
a step of calculating, based on the performance deterioration of each application and the usage state of the cache, an indicator for the cache sensitivity and/or an indicator for the cache pollutivity of each application, wherein the step of calculating comprises: performing multiple regression analysis using the performance deterioration of each application as a target variable and the usage state of the cache as a descriptive variable, and calculating a partial regression coefficient.

11. The non-transitory computer readable medium according to claim 10, wherein the cache usage indicator calculation program further causing the computer to perform: using an average of degrees of performance deterioration of a first application among a pre-selected plurality of applications obtained when the first application is operated in combination with a second application among the plurality of applications, with respect to a performance obtained when the first application is operated alone, as the cache sensitivity of the first application.

12. The non-transitory computer readable medium according to claim 10, wherein the cache usage indicator calculation program further causing the computer to execute: using an average of degrees of performance deterioration of a first application among a pre-selected plurality of applications obtained when the first application is operated in combination with a second application among the plurality of applications, with respect to a performance obtained when the first application is operated alone, as the cache pollutivity of the second application.

13. The non-transitory computer readable medium according to claim 10, wherein the cache usage indicator calculation program further causing the computer to execute: calculating the cache sensitivity and/or the cache pollutivity of an application based on the partial regression coefficient and the usage state of the cache.

\* \* \* \* \*